(12) United States Patent
Lee

(10) Patent No.: US 11,975,691 B2
(45) Date of Patent: May 7, 2024

(54) LUGGAGE DEVICE FOR VEHICLE

(71) Applicants: Hyundai Motor Company, Seoul (KR); Kia Motors Corporation, Seoul (KR)

(72) Inventor: Jae Seung Lee, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 738 days.

(21) Appl. No.: 17/164,015

(22) Filed: Feb. 1, 2021

(65) Prior Publication Data

US 2022/0055700 A1 Feb. 24, 2022

(30) Foreign Application Priority Data

Aug. 18, 2020 (KR) .......................... 10-2020-0103294

(51) Int. Cl.
*B60R 9/06* (2006.01)
*B60R 5/04* (2006.01)

(52) U.S. Cl.
CPC .............. *B60R 9/065* (2013.01); *B60R 5/042* (2013.01)

(58) Field of Classification Search
CPC ...................................................... B60R 9/065
See application file for complete search history.

(56) References Cited

U.S. PATENT DOCUMENTS

| 1,884,736 | A | * | 10/1932 | King | .................. | B60R 9/065 |
| | | | | | | 190/15 A |
| 5,029,740 | A | * | 7/1991 | Cox | .................. | B60R 9/065 |
| | | | | | | 224/535 |
| 5,106,002 | A | * | 4/1992 | Smith | .................. | B60R 9/065 |
| | | | | | | 224/508 |
| 5,536,130 | A | * | 7/1996 | Edensor | .................. | B60R 9/065 |
| | | | | | | 224/495 |
| 6,077,024 | A | * | 6/2000 | Trueblood | .................. | B60P 1/003 |
| | | | | | | 224/404 |
| 10,328,837 | B2 | * | 6/2019 | Peles | .................. | B60P 1/6409 |
| 11,279,296 | B2 | * | 3/2022 | Condon, II | .................. | B60R 9/065 |
| 2021/0016717 | A1 | * | 1/2021 | Bonenberger | .................. | B60R 9/08 |

FOREIGN PATENT DOCUMENTS

KR 20100086974 A 8/2010

\* cited by examiner

*Primary Examiner* — Tony H Winner
*Assistant Examiner* — Hosam Shabara
(74) *Attorney, Agent, or Firm* — Slater Matsil, LLP

(57) ABSTRACT

A luggage device for a vehicle includes a container including a door that is openable and closable, a first mounting portion facing the door, and a second mounting portion configured to connect the door to the first mounting portion, the container having a fillable space formed therein, and a drive mechanism configured to connect the container to a mount subject such that the first mounting portion or the second mounting portion is attached to the mount subject and to switch mount directions of the container.

20 Claims, 30 Drawing Sheets

LUGGAGE DEVICE FOR VEHICLE

CROSS-REFERENCE TO RELATED APPLICATIONS

This application claims priority to Korean Patent Application No. 10-2020-0103294, filed on Aug. 18, 2020, which application is hereby incorporated herein by reference.

TECHNICAL FIELD

The present disclosure relates to a luggage device for a vehicle.

BACKGROUND

An ultra-compact mobility refers to a three-wheel or four-wheel vehicle having a more compact size than that of a compact vehicle, and about a two-seater. In recent years, interest in the ultra-compact mobility has grown and there may be several reasons for this.

First, in recent years, as the elderly population has increased, securing a means of transportation for the elderly has emerged as an urgent task. Further, as the number of single-person households steadily increases, the single-person household tends to prefer the compact vehicle to four-seaters or more. Even in terms of environmental aspects, such as low emission of carbon and the use of eco-friendly energy, demand for the eco-friendly vehicle is increasing. As the ultra-compact mobility may meet all of these needs, the related market tends to continuously increase.

The ultra-compact mobility itself is so small that the vehicle lacks a space to transport loads. Therefore, several methods for providing a loading space have been devised. For example, the ultra-compact mobility is configured to mount loads on top of the vehicle or to mount an additional luggage box on the rear of the vehicle.

There is still a need for a device which may effectively expand the loading space compared to these methods.

The foregoing is intended merely to aid in the understanding of the background of the present invention, and is not intended to mean that the present invention falls within the purview of the related art that is already known to those skilled in the art.

Korean Patent Application Publication No. 10-2010-0086974 (published on Aug. 2, 2010) provides information related to the subject matter of the present disclosure.

SUMMARY

The present disclosure relates to a luggage device for a vehicle. Particular embodiments relate to a luggage device for a vehicle, communicating with the inside of a vehicle to provide an expanded loading space.

Embodiments of the present disclosure can solve problems associated with prior art.

An embodiment of the present disclosure provides a luggage device capable of providing an expanded loading space to a vehicle.

Another embodiment of the present disclosure provides a luggage device for a vehicle having convenience in use as in mounting or detaching.

Further, still another embodiment of the present disclosure provides a luggage device for a vehicle capable of changing a mounting direction thereof.

The embodiments of the present disclosure are not limited to the aforementioned embodiments, and other embodiments not mentioned may be clearly understood to those skilled in the art to which the present disclosure pertains (hereinafter, referred to as "those skilled in the art") from the following description.

Characteristics of embodiments of the present disclosure for achieving aspects of the present disclosure and performing functions of the present disclosure are as follows.

In an embodiment, the luggage device for a vehicle comprises a container comprising an openable or closable door, a first mounting portion facing the door, and a second mounting portion configured to connect the door to the first mounting portion and having an empty space formed therein, and a drive mechanism configured to connect the container to a mount subject such that the first mounting portion or the second mounting portion are attached to the mount subject and switch mount directions of the container.

It is understood that the term "vehicle" or "vehicular" or "automotive" or other similar term as used herein is inclusive of motor vehicles in general such as passenger automobiles including sports utility vehicles (operation SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Other aspects and preferred embodiments of the invention are discussed infra.

The above and other features of the invention are discussed infra.

DETAILED DESCRIPTION OF ILLUSTRATIVE EMBODIMENTS

Figure 1:
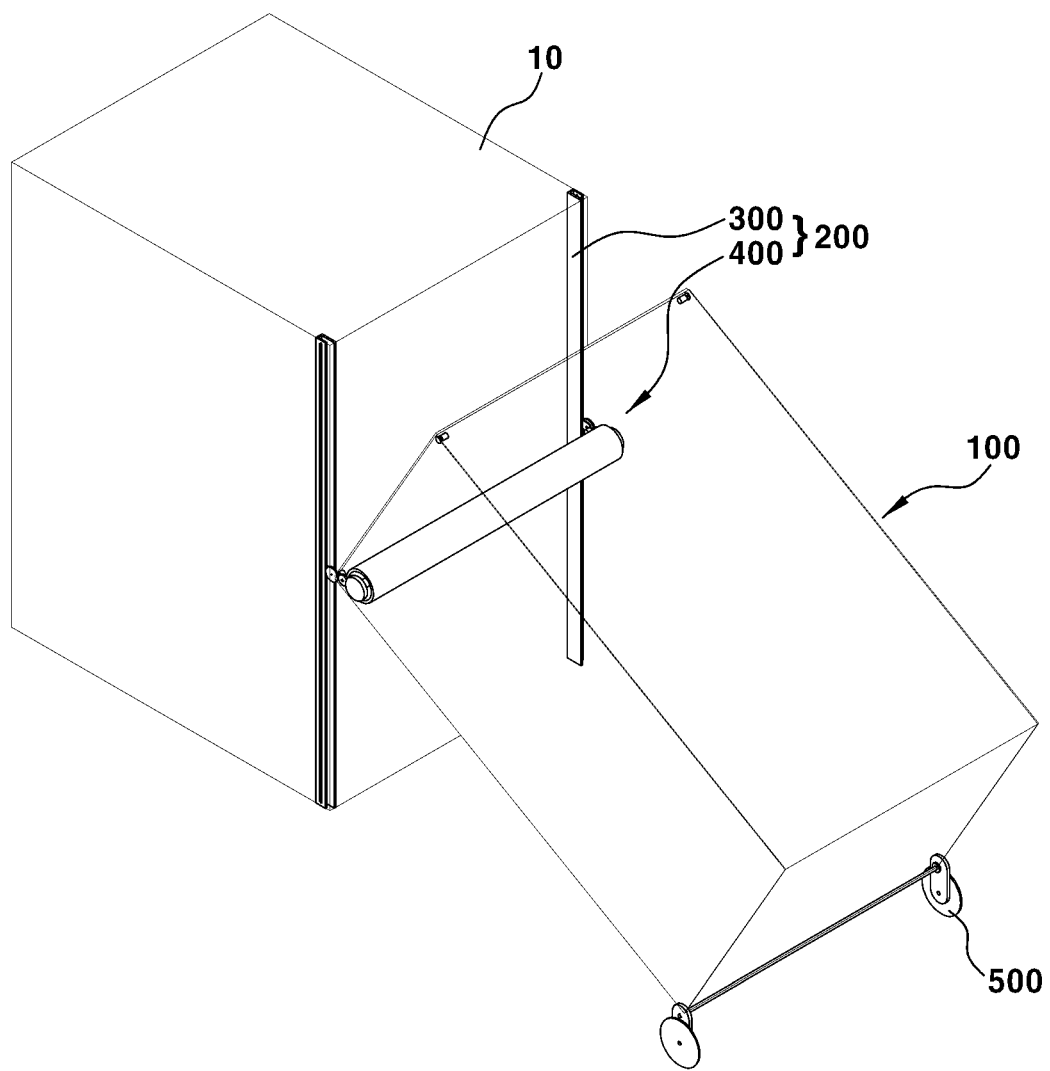
FIG. 1 illustrates a luggage device according to embodiments of the present disclosure.

Hereinafter, preferred embodiments of the present disclosure will be described in detail with reference to the accompanying drawings. Specific structures or functions described in the embodiments of the present disclosure are merely for illustrative purposes. Embodiments according to the concept of the present disclosure may be implemented in various forms, and it should be understood that they should not be construed as being limited to the embodiments described in the present specification, but include all modifications, equivalents, or substitutes included in the spirit and scope of the present disclosure.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

Like reference numerals denote like components throughout the specification. In the meantime, the terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise," "include," "have," etc., when used in this specification, specify the presence of stated components, steps, operations, and/or elements, but do not preclude the presence or addition of one or more other components, steps, operations, and/or elements thereof.

Although the ultra-compact mobility has been mainly discussed in the background above, the present disclosure may be applied to all vehicles, particularly, all vehicles having a tailgate, as well as the ultra-compact mobility.

Hereinafter, the present disclosure will be described in detail with reference to the accompanying drawings.

As illustrated in FIG. 1, a luggage device for a vehicle according to embodiments of the present disclosure includes a container 100 and a drive mechanism 200.

Figure 2:
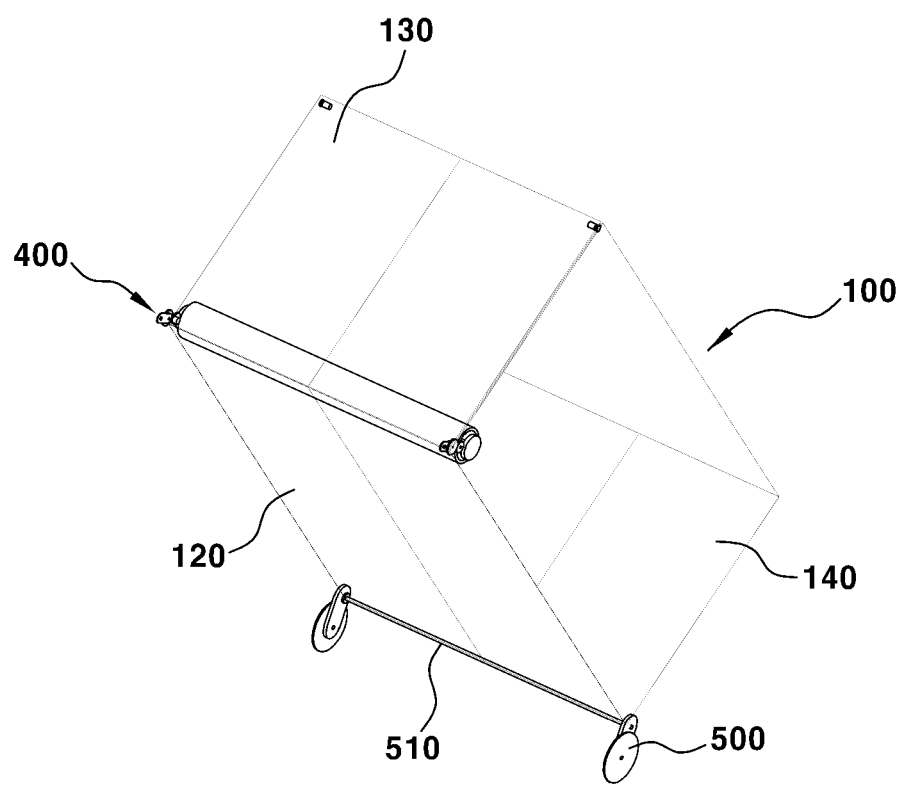
FIGS. 2 and 3 illustrate a container for the luggage device according to embodiments of the present disclosure.
Figure 3:
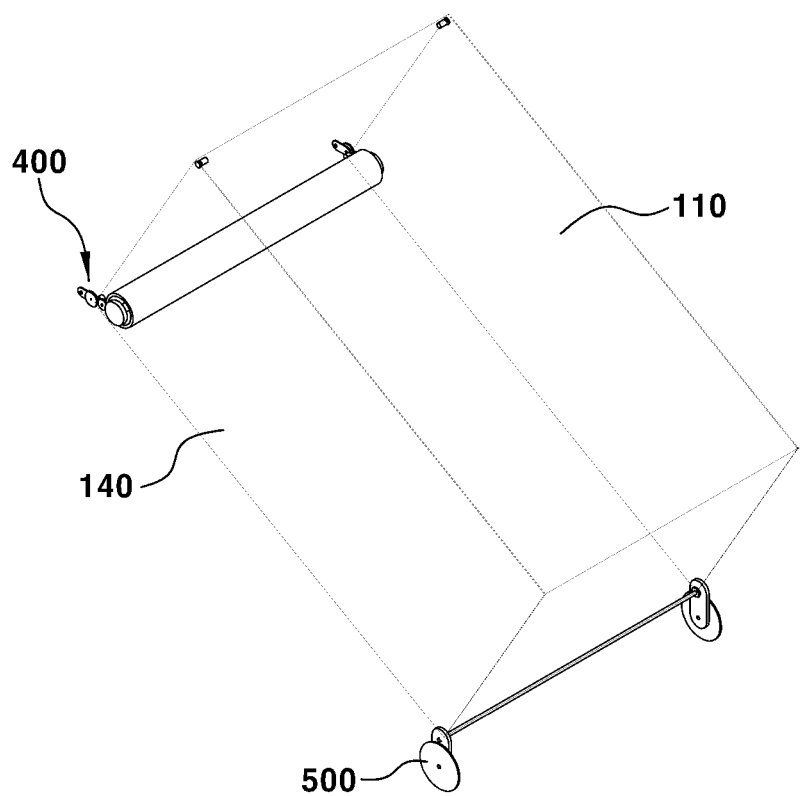

As illustrated in FIGS. 2 and 3, the container 100 has an empty space inside for accommodating goods or the like. In FIGS. 2 and 3, although it has been illustrated that the container 100 has a shape of a rectangular box, the container 100 is not limited thereto and may also have other shapes.

A side of the container boo may be sized similarly or substantially the same as the size of a side of vehicle, on which a tailgate is installed. On the side of the container 100 to be mounted is a first mounting portion 120. According to an exemplary embodiment of the present disclosure, the container 100 includes a door 110, the first mounting portion 120, and a second mounting portion 130. Further, the container 100 may further include side portions 140 and a bottom portion 150.

The door 110 is disposed at a side of the container 100. Further, the door 110 may be opened to access the empty space inside the container 100 through the door 110. An opening or closing method of the door 110 is not specially limited. As non-limiting examples, the door may be opened through a hinge connection to the container 100 or may be slid open.

The first mounting portion 120 is disposed in the container 100 to face the door 110. As described above, the first mounting portion 120 may be sized to correspond to an opening of a mount subject 10 or the tailgate to which the luggage device according to embodiments of the present disclosure is to be installed.

The first mounting portion 120 may be opened. That is, the empty space inside the container 100 may be accessible through the first mounting portion 120. When both the door no and the first mounting portion 120 are open, the outside of the container 100 can communicate through the door 110, the empty space inside the container 100 and the first mounting portion 120.

The first mounting portion 120 may be rollable, like a scroll. According to an exemplary embodiment of the present disclosure, the first mounting portion 120 being made of a flexible material may be wound around or unwound from a roller unit 460, which will be described later, such that the side of the container 100 where the first mounting portion 120 is disposed may be opened or closed.

Figure 4A:
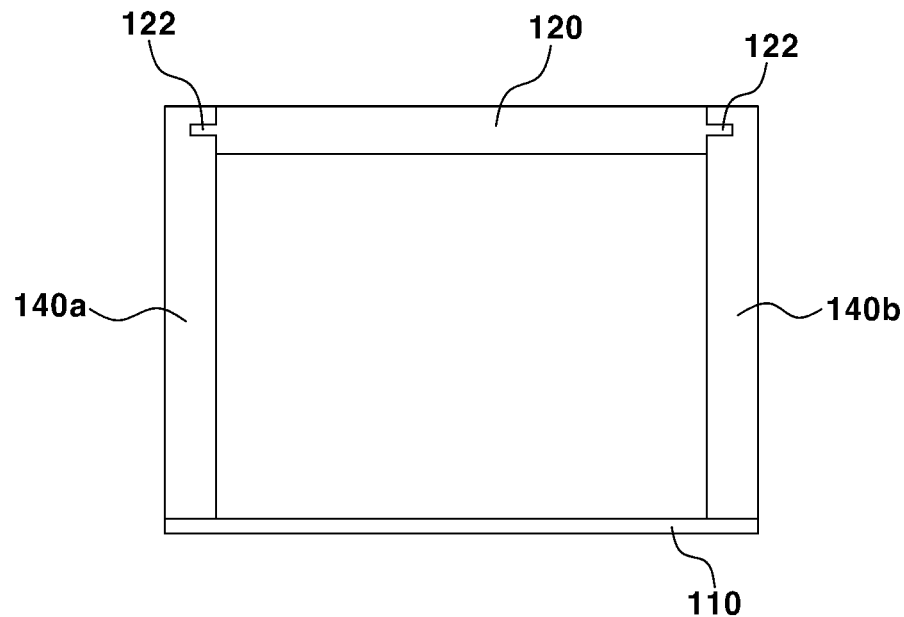
FIG. 4A illustrates a horizontal cross-section of the container for the luggage device according to embodiments of the present disclosure.

As illustrated in FIG. 4A, according to an exemplary embodiment of the present disclosure, protrusions 122 having a different thickness from other parts of the first mounting portion 120 are arranged on both sides of the first mounting portion 120. The protrusions 122 may engage with coupling portions 142 depressed in the side portion 140. The protrusions 122 serve to guide the first mounting portion 120 when the first mounting portion 120 is moved.

The second mounting portion 130 connects the door no to the first mounting portion 120. Particularly, the second mounting portion 130 may be a side of the container 100, horizontally connecting the door no to the first mounting portion 120. According to an exemplary embodiment of the present disclosure, the area of the second mounting portion 130 is smaller than the area of the first mounting portion 120.

The second mounting portion 130 may be opened. According to an exemplary embodiment of the present disclosure, the second mounting portion 130 may be opened or closed by sliding. When the second mounting portion 130 is opened, the empty space inside the container 100 may be accessible through the second mounting portion 130. According to an exemplary embodiment of the present disclosure, the second mounting portion 130 may be opened or closed through operation of one or more operation motors 160 to be described later.

Figure 4B:
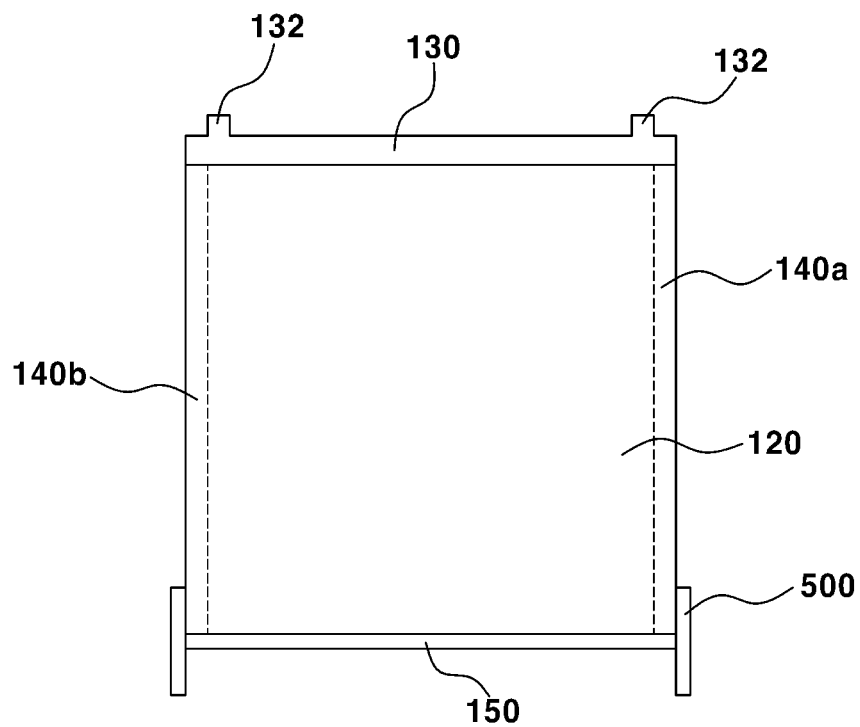
FIG. 4B illustrates a state where the container for the luggage device according to embodiments of the present disclosure is viewed from a first mounted part side.

As illustrated in FIG. 4B, the second mounting portion 130 includes one or more ridges 132 protruding from the surface of the second mounting portion 130. The ridges 132 protrude from the outer surface of the second mounting portion 130 and may be provided at both sides of the second mounting portion 130. The ridges 132 serve to guide the movement of the second mounting portion 130 when the second mounting portion 130 moves along a rail 300 in order to open or close the second mounting portion 130. This will be described later.

The side portions 140 and the bottom portion 150 are provided to enclose the container 100 together with the door 110, the first mounting portion 120, and the second mounting portion 130. The side portions 140 and the bottom portion 150 are sides of the container 100, which are fixed in the container 100. The side portions 140 and the bottom portion 150 support the door 110, the first mounting portion 120, and the second mounting portion 130 to be movable with respect to the container 100. The bottom portion 150 faces the second mounting portion 130, and the side portion 140 closes both sides of the container 100, defined by the first mounting portion 120, the second mounting portion 130, the door 110, and the bottom portion 150. The first mounting portion 120, the second mounting portion 130, the door 110, and the bottom portion 150 produce a pair of open faces in the container 100, so the side portions 140 may include a first side portion 140a and a second side portion 140b. The first side portion 140a and the second side portion 140b are disposed to substantially face each other. These two components are the same components in the present specification and will be described as the first side portion 140a and the second side portion 140b merely for convenience of explanation.

Figure 5A:
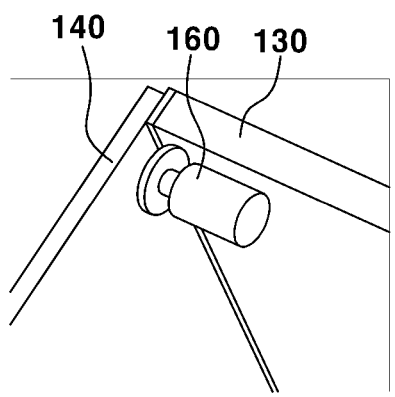
FIGS. 5A and 5B illustrate states where the inside of the container is viewed with a door of the container opened for the luggage device according to embodiments of the present disclosure.
Figure 5B:
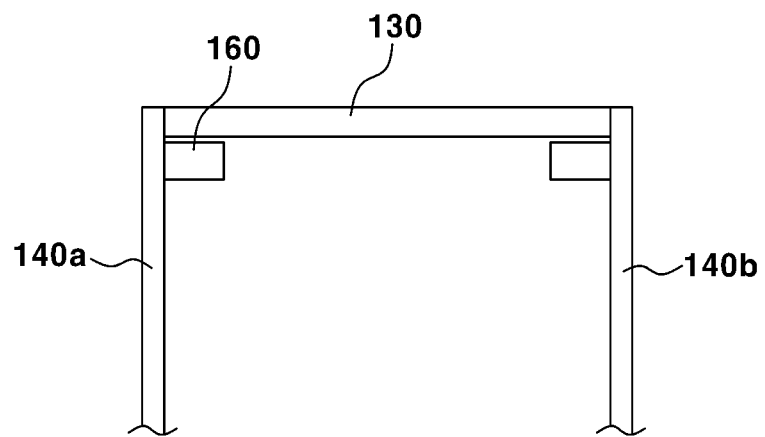

As illustrated in FIGS. 5A and 5B, the operation motor 160 is mounted on the side portion 140 and, more specifically, positioned on the side portion 140 near where the door 110 and the second mounting portion 130 meet. When the operation motor 160 is driven, the second mounting portion 130 is mounted to be relatively movable with respect to a driving motor 440. Preferably, the operation motor 160 is mounted on each of the first side portion 140a and the second side portion 140b. That is, one operation motor 160 is disposed on the first side portion 140a and the other operation motor 160 is disposed on the second side portion 140b.

Figure 6:
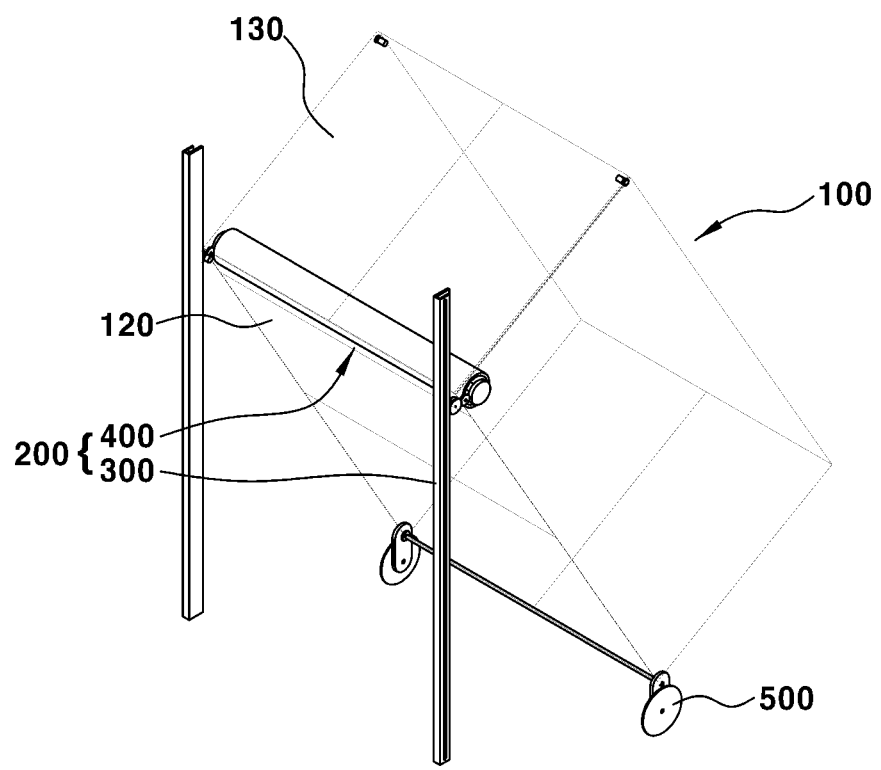
FIG. 6 illustrates the luggage device according to embodiments of the present disclosure.

The drive mechanism 200 serves to connect the container 100 to the mount subject 10 and to switch the mount direction of the container 100 with respect to the mount subject 10. Here, the mount subject 10 is a target on which the luggage device according to embodiments of the present disclosure is installed and may include a tailgate opening or the like of a vehicle. As illustrated in FIG. 6, according to an exemplary embodiment of the present disclosure, the drive mechanism 200 includes one or more rails 300 and a link assembly 400.

Figure 7A:
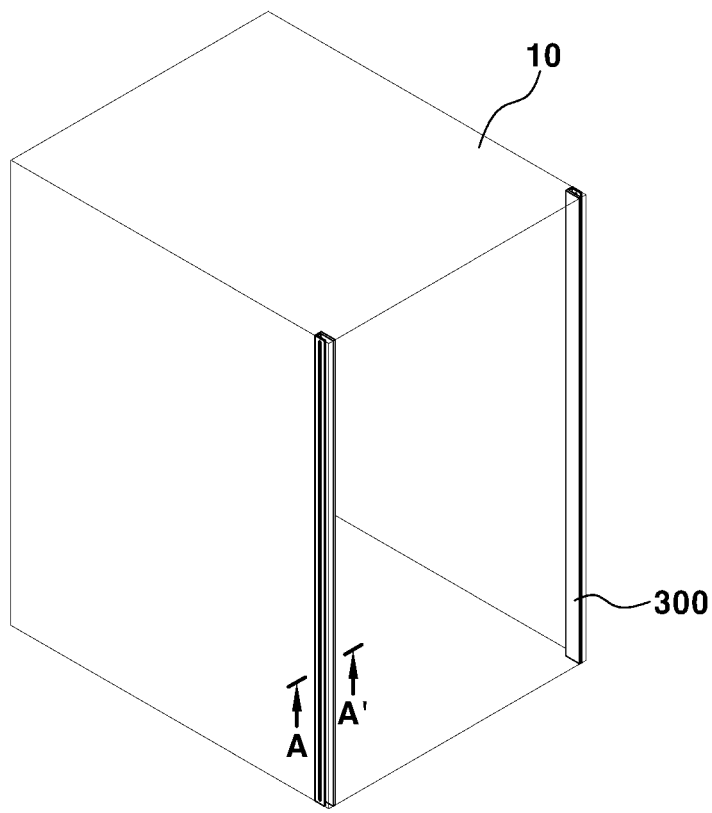
FIG. 7A illustrates a rail for the luggage device according to embodiments of the present disclosure.
Figure 7B:
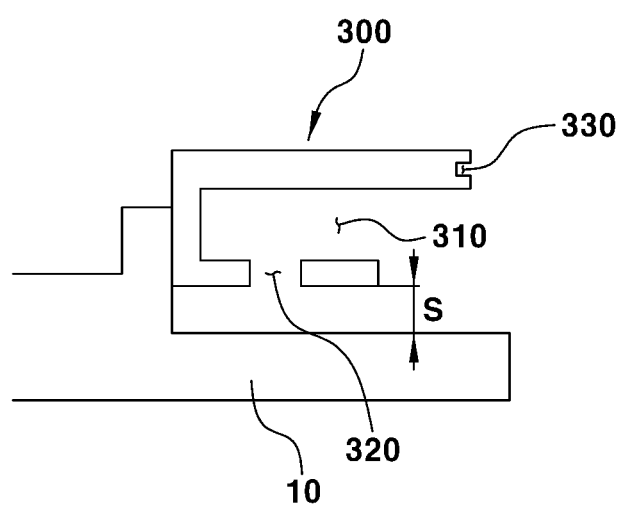
FIG. 7B is a cross-section taken along the line A-A' illustrated in FIG. 7A.

Referring to FIG. 7A, the rail 300 mounts the container 100 to the vehicle in conjunction with the link assembly 400 and allows the mount direction of the container 100 to be switched. The rail 300 is positioned on a wall of the mount subject 10 or the like and connected to the link assembly 400 such that the link assembly 400 is movable on the rail 300. As illustrated in FIG. 7B, the rail 300 includes an insertion groove 310 and a guide groove 320.

The insertion groove 310 is opened along the longitudinal direction of the rail 300 such that the inner side of the rail 300 is accessible. The insertion groove 310 is opened toward the outside of the mount subject 10 and faces the first mounting portion 120.

The guide groove 320 is opened at a side of the rail 300 along the longitudinal direction of the rail 300. The guide groove 320 is opened toward a direction substantially perpendicular to the insertion groove 310 and opened toward the wall of the mount subject 10.

A gap S having a predetermined length is arranged between the rail 300 and the mount subject 10. The gap S is provided to prevent interference between the link assembly 400 and the mount subject 10 while the link assembly 400 moves.

The rail 300 may have a depression 330 recessed from the surface of the rail 300. The depression 330 is positioned at a side of the rail 300, facing the first mounting portion 120 or the second mounting portion 130, and the depression 330 is parallel to the insertion groove 310. The depression 330 may engage with the ridge 132 of the second mounting portion 130 to guide the movement of the second mounting portion 130.

Figure 8A:
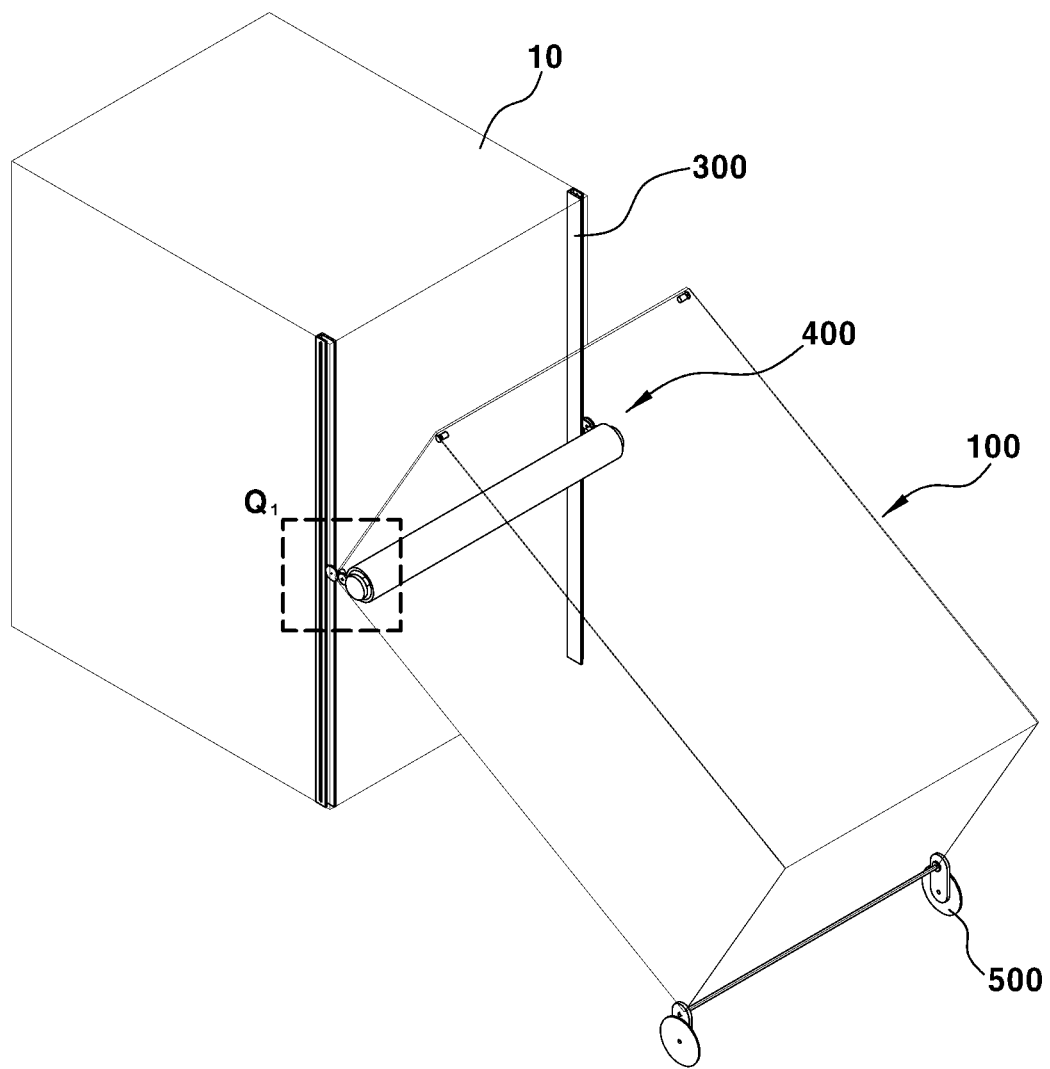
FIG. 8A illustrates the luggage device according to embodiments of the present disclosure.
Figure 8B:
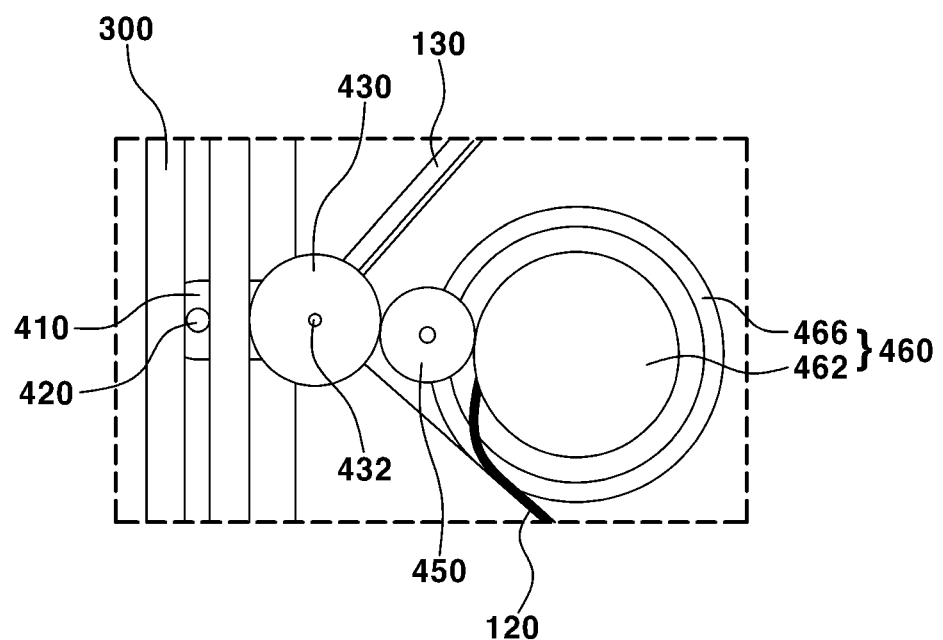
FIG. 8B is an enlarged view illustrating a portion indicated by $Q_1$ in FIG. 8A.

As illustrated in FIGS. 8A and 8B, the link assembly 400 may be detachable from the rail 300 and slidingly movable along the rail 300. The link assembly 400 may be mounted on the side portion 140 and near where the first mounting portion 120 and the second mounting portion 130 meet.

Figure 9A:
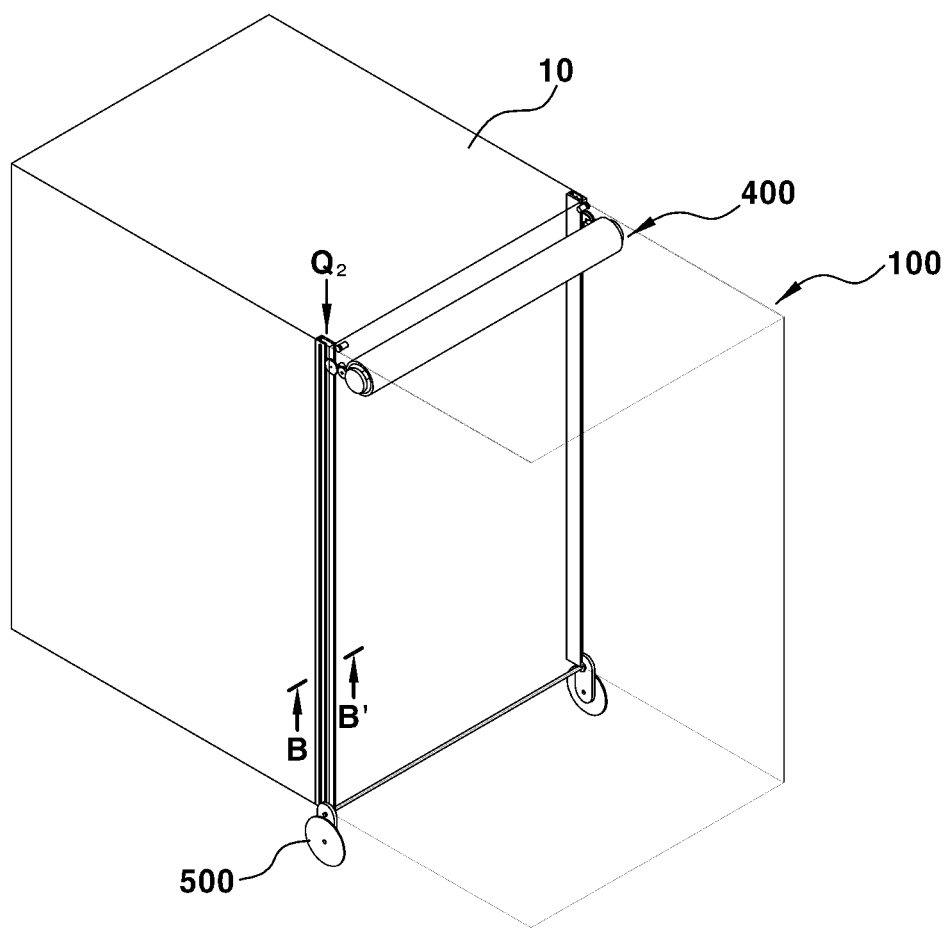
FIG. 9A illustrates the luggage device according to embodiments of the present disclosure.
Figure 9B:
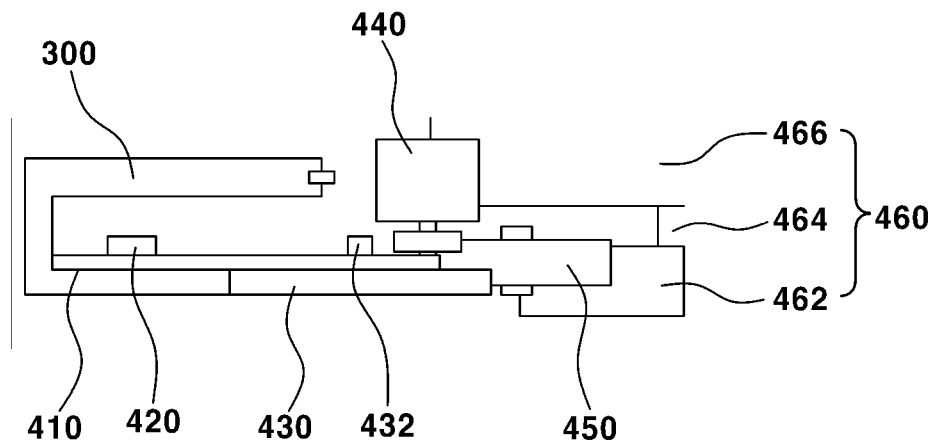
FIG. 9B illustrates a state viewed in the arrow direction indicated by $Q_2$ in FIG. 9A.
Figure 9C:
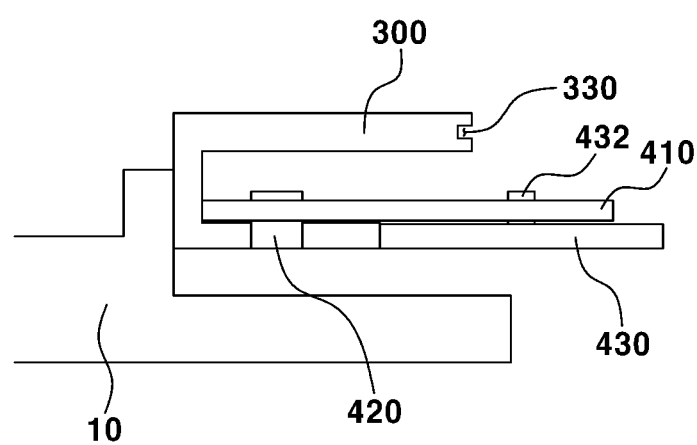
FIG. 9C is a cross-section taken along the line B-B' in FIG. 9A.

As illustrated in FIGS. 9A to 9C, the link assembly 400 may include a base plate 410, a guide pin 420, a rotary gear 430, a driving motor 440, a main gear 450, and a roller gear 462.

The base plate 410 is coupled to the container 100 and serves as a base connecting the container 100 to the mount subject 10. Also, the base plate 410 supports the guide pin 420 and the rotary gear 430.

A guide pin 420 is coupled at one side of the base plate 410. The guide pin 420 is insertable into the guide groove 320 of the rail 300 and guides the movement of the link assembly 400 on the rail 300.

The rotary gear 430 is rotatably mounted at the other side of the base plate 410. The rotary gear 430 is configured to contact the rail 300 and roll along the rail 300, facilitating the movement of the container 100 on the rail 300.

A pin member 432 is coupled to the side portion 140 and penetratingly mounted to the base plate 410 and the rotary gear 430. The rotary gear 430 is rotatable in the base plate 410 by the pin member 432.

The driving motor 440 is disposed on the inner side of the container 100 and, more specifically, mounted on the inner side of the side portion 140. The driving motor 440 implements a relative location change of the container 100, a change in the mount direction of the container 100, and detachment and attachment of the container 100. That is, the driving motor 440 provides a driving force when the mount direction of the container 100 is changed and the first mounting portion 120 is opened or closed.

The main gear 450 is rotatably mounted at the side portion 140. The main gear 450 is rotatable by the operation of the driving motor 440. According to an exemplary embodiment of the present disclosure, the main gear 450 is mounted to penetrate the side portion 140 such that a part of the main gear 450 is disposed inside the container 100, and the other part of the main gear 450 is disposed outside the container 100. The main gear 450 may receive rotational force from the driving motor 440 inside the container 100 and transfer the rotational force to the rotary gear 430 contacting with the main gear 450 outside the container 100. That is, the rotational force of the driving motor 440 may be transferred to the main gear 450, and the main gear 450 may allow the rotary gear 430 to rotate in engagement with the main gear 450. The main gear 450 serves to transfer power from the driving motor 440 for switching the mount direction of the container 100.

Figure 10:
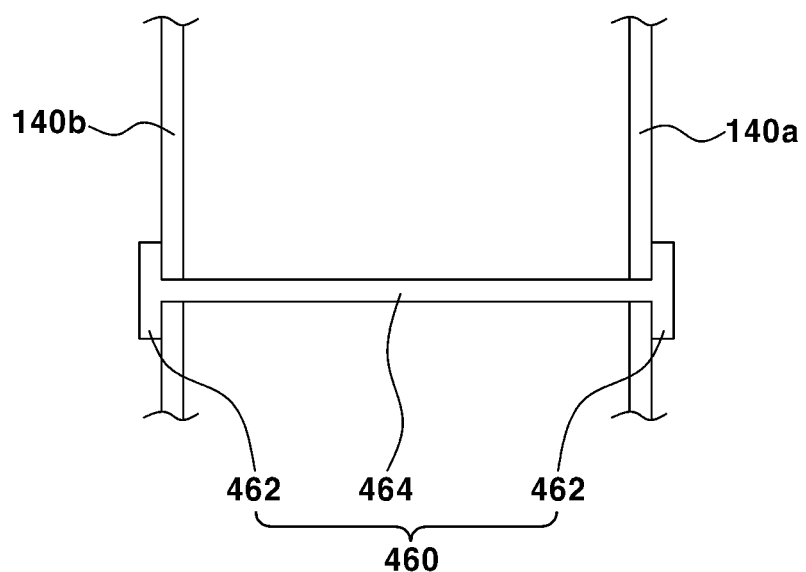
FIG. 10 illustrates a partial horizontal cross-section of the container for the luggage device according to embodiments of the present disclosure.

Further, the main gear 450 is disposed in contact with the roller unit 460. The roller unit 460 includes a pair of roller gears 462 and a rod 464. As illustrated in FIG. 10, the rod 464 penetrates side portions 140, and the roller gears 462 are disposed at both ends of the rod 464. Each of the roller gears 462 is configured to be rotatable by the rotation of the main gear 450 at the first side portion 140a and the second side portion 140b. As a result, the roller units 460 may rotate together with the rotation of the main gear 450.

The first mounting portion 120 may be wound around the roller unit 460. More specifically, the first mounting portion 120 may be wound around the rod 464. The wound first mounting portion 120 may be unwound from the rod 464 by the rotation of the main gear 450, and the unwound first mounting portion 120 may be wound around the rod 464 by the rotation of the main gear 450.

Further, the roller unit 460 may further include a roller casing 466 for protecting the wound first mounting portion 120.

The luggage device according to embodiments of the present disclosure may further include a rolling member 500. The rolling member 500 is mounted on the container 100 to support the weight of the container 100. According to an exemplary embodiment of the present disclosure, the rolling members 500 are provided at each of the first side portion 140a and the second side portion 140b and mounted on the lower sides of the first side portion 140a and the second side portion 140b. The rolling members 500 may be connected with each other by a connection shaft 510, and the connection shaft 510 may be mounted to be rotatable with the rolling member 500.

Figure 11A:
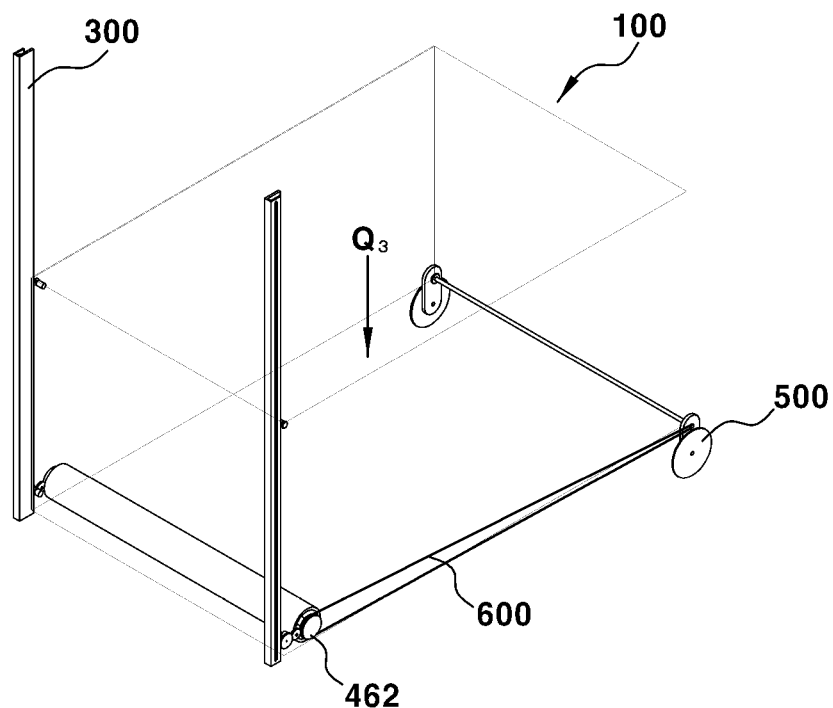
FIG. 11A illustrates a horizontal expansion type, as the luggage device according to embodiments of the present disclosure.
Figure 11B:
FIG. 11B illustrates a state viewed in the arrow direction indicated by $Q_3$ in FIG. 11A.
Figure 11C:
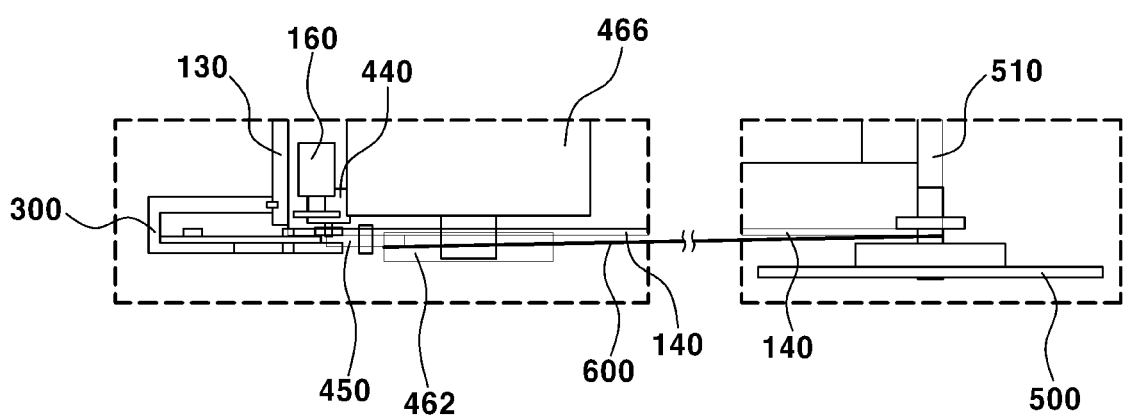
FIG. 11C is an enlarged view illustrating portions indicated by $Q_4$ and $Q_5$ in FIG. 11B.

Referring to FIGS. 11A to 11C, the luggage device according to embodiments of the present disclosure may further include a belt member 600 connecting each rolling member 500 of the pair of rolling members 500 to each of the roller gears 462. One side of the belt member 600 is attached to the roller gear 462, and the other side of the belt member 600 is attached to the connection shaft 510 of the rolling member 500. Therefore, the rotational force of the roller gear 462 is transferred to the connection shaft 510 of the rolling member 500.

Figure 12A:
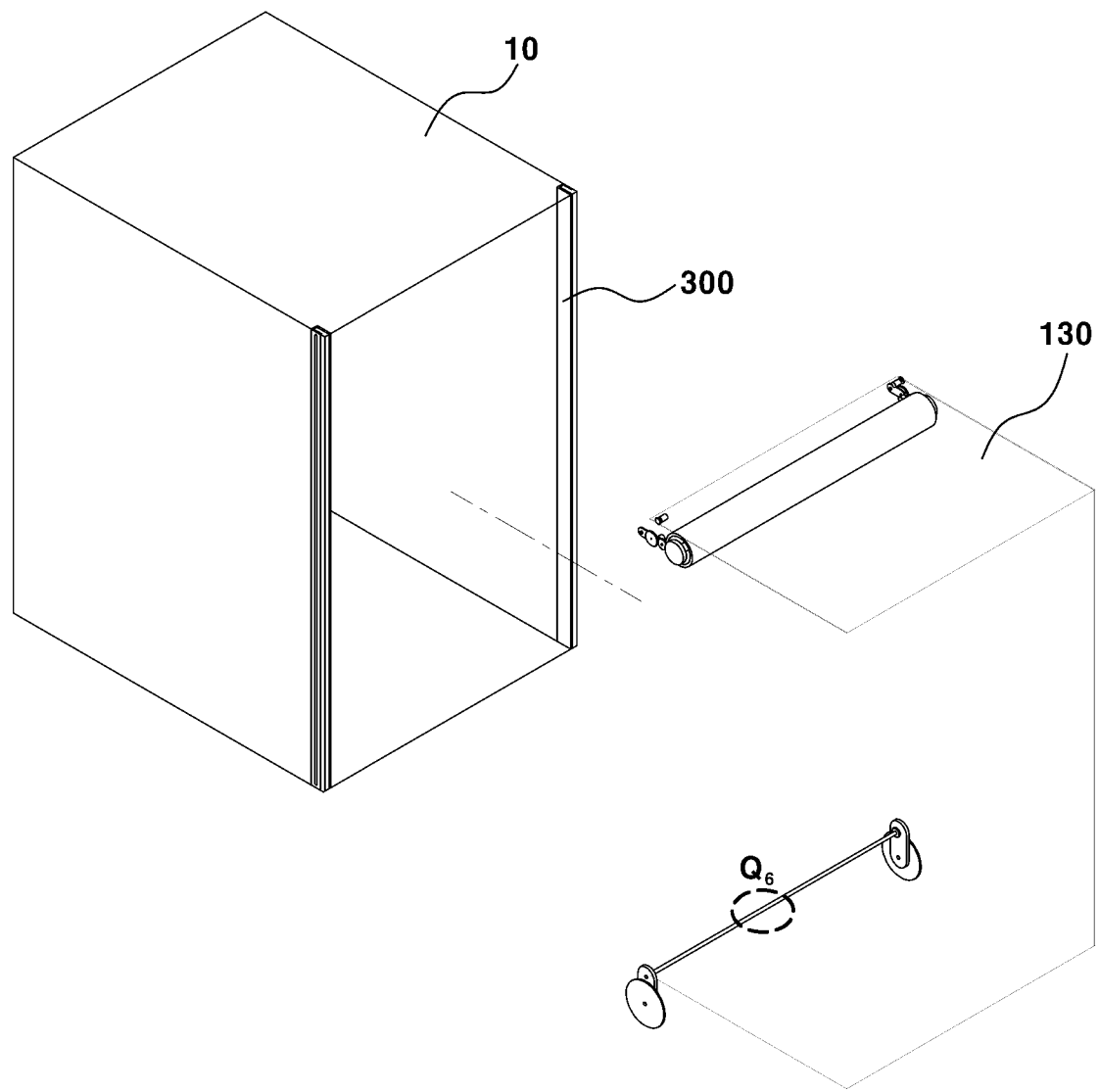
FIG. 12A illustrates a state before the luggage device according to embodiments of the present disclosure is mounted on a vehicle.
Figure 12B:
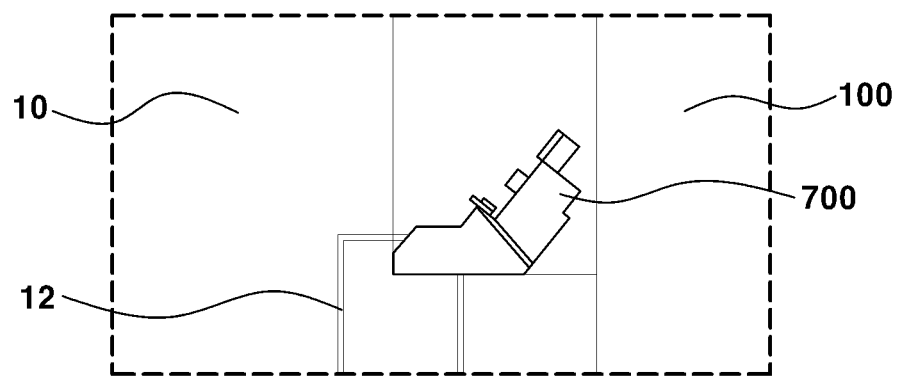
FIG. 12B is an enlarged diagram illustrating a portion indicated by $Q_6$ in FIG. 12A.

As illustrated in FIGS. 12A and 12B, the luggage device according to embodiments of the present disclosure may further include a latch 700. The latch 700 provides an additional fixing force when the first mounting portion 120 side is coupled to the mount subject 10. The latch 700 may be formed on the bottom portion 150 and fixed to a striker 12 provided on the mount subject 10.

Now the operation and effects of the luggage device according to embodiments of the present disclosure will be described.

The luggage device according to embodiments of the present disclosure provides a vertical expansion type in which the first mounting portion 120 side is attached to the mount subject 10 and a horizontal expansion type in which the second mounting portion 130 side is attached to the mount subject 10. Particularly, the former may expand the loading space of the mount subject 10 such that the luggage having a large volume may be loaded, and the latter may be efficient when it comes to loading long loads.

The vertical expansion type in which the first mounting portion 120 side is attached will be described with reference to FIGS. 13A to 13D.

Figure 13A:
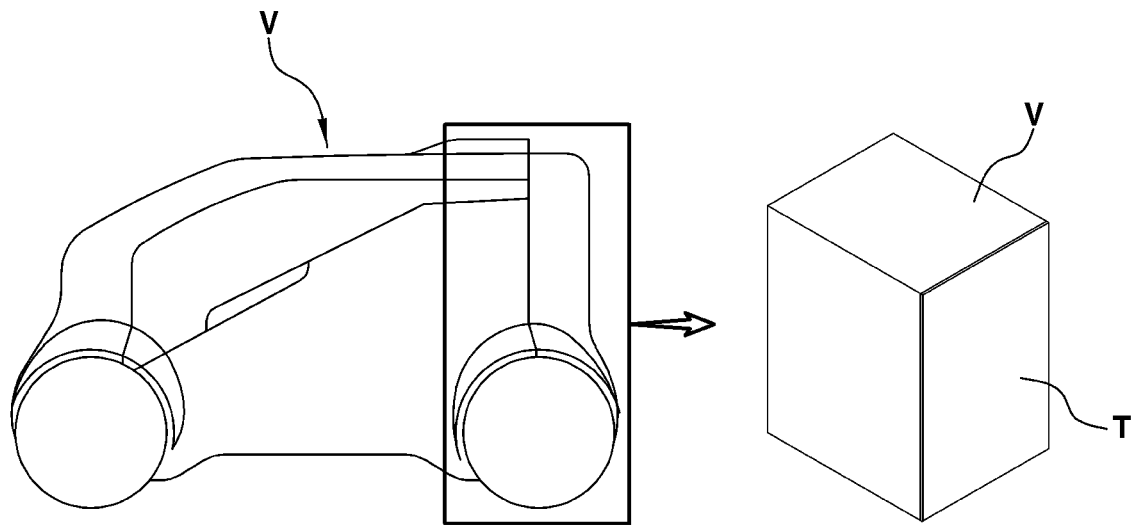
FIGS. 13A to 13E illustrate a process of mounting a vertical expansion type of the luggage device according to embodiments of the present disclosure.
Figure 13B:
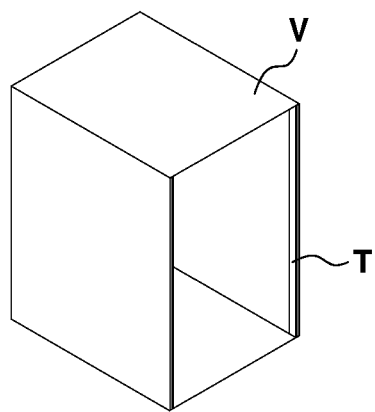
Figure 13C:
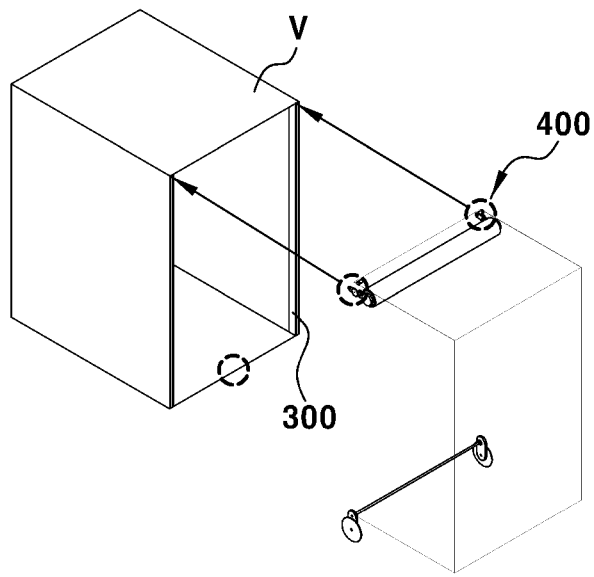
Figure 13D:
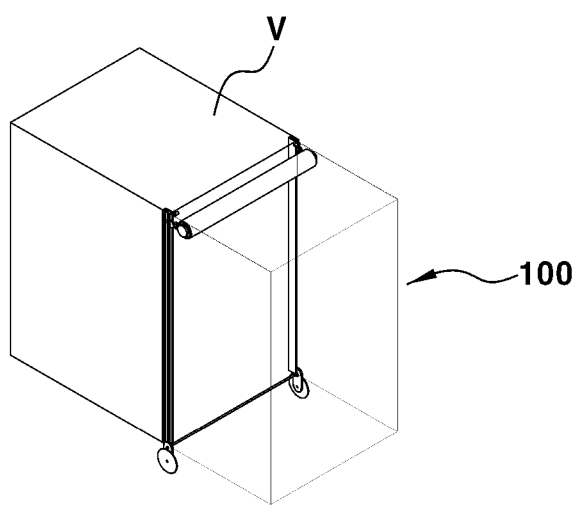

To communicate the container 100 and the mount subject 10 or the inner space of a vehicle V with each other, a tailgate T of the vehicle V is first removed (see FIGS. 13A and 13B).

Subsequently, the link assembly 400 is mounted on the rail 300 installed in the vehicle V. Particularly, the link assembly 400 is inserted into the insertion groove 310 such that the guide pin 420 is engaged with the guide groove 320. After the latch 700 provided on the bottom portion 150 is coupled to the striker 12 of the vehicle V in order to provide the additional fixing force, the mounting is completed (see FIGS. 13C and 13D).

Figure 13E:
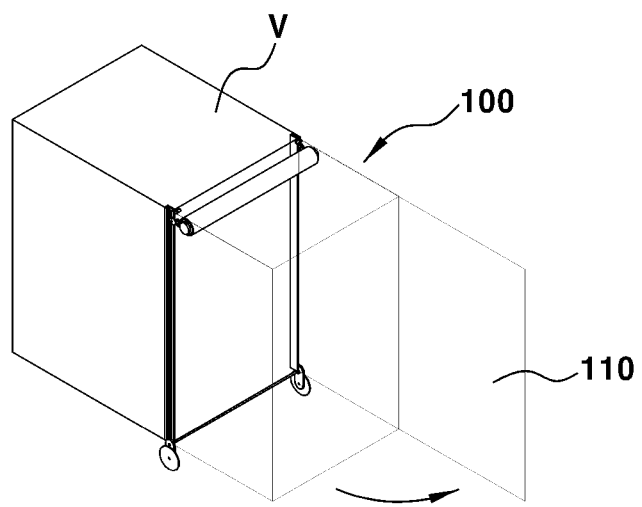

Loads may be placed into the container 100 by opening the door 110 (see FIG. 13E). That is, the vertical expansion type may provide an additional amount of space corresponding to the volume of the container 100, thereby conveniently transporting loads with a considerable height or large volume.

Figure 14:
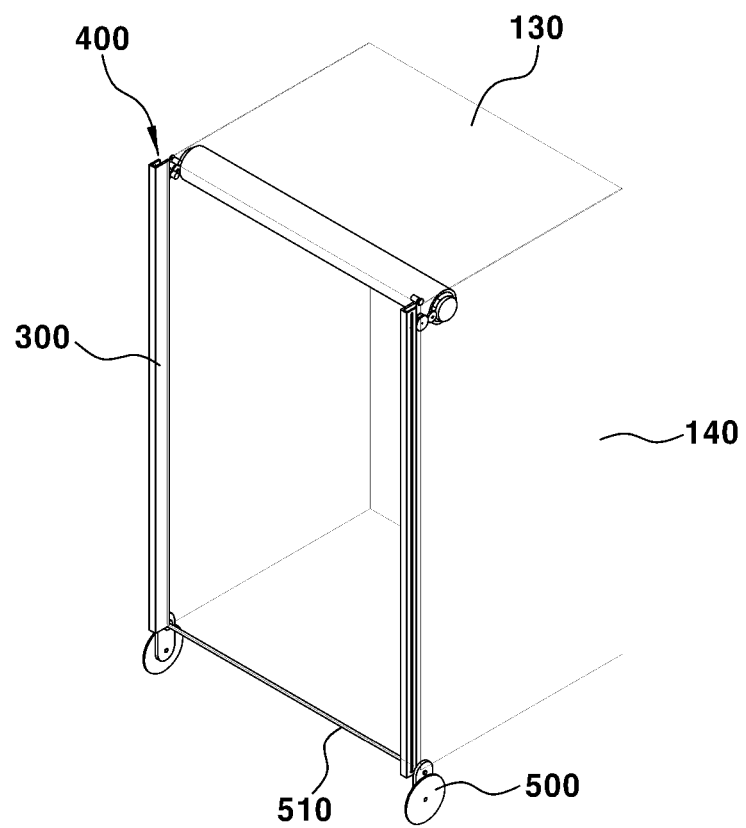
FIGS. 14 and 15 illustrate states where the first mounting portion is wound around and unwound from a roller unit in the container for the luggage device according to embodiments of the present disclosure, respectively.

Referring to FIG. 14, according to an exemplary embodiment of the present disclosure, in case of the vertical expansion type, when the container 100 is mounted on the vehicle V, the first mounting portion 120 is maintained in an open state to provide a wider space. In other words, if the first mounting portion 120 side is mounted on the vehicle V, the first mounting portion 120 is wound around the roller unit 460 to maintain the open state.

Figure 15:
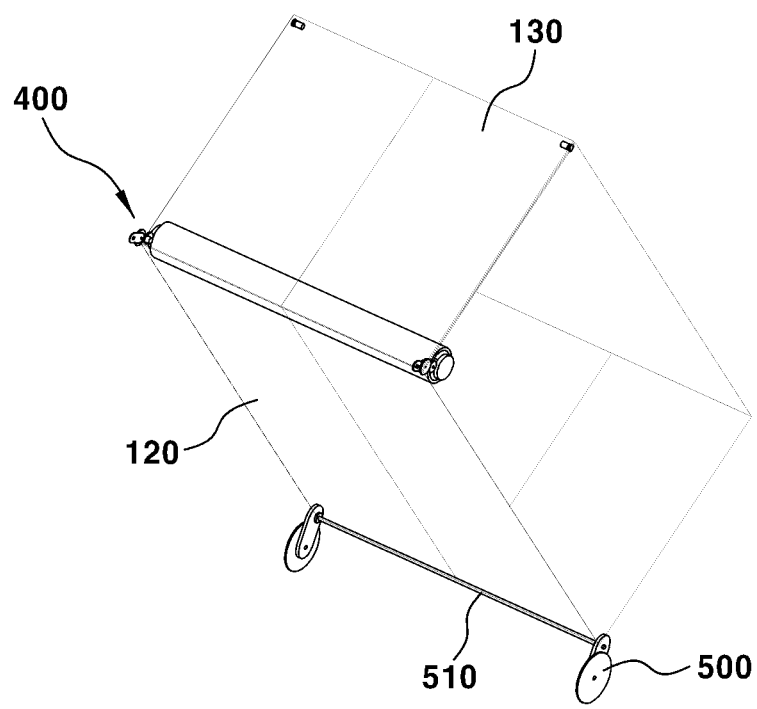

However, as illustrated in FIG. 15, if the space inside the container 100 and the space inside the vehicle V need to be separated, the first mounting portion 120 may also be in a closed state.

The horizontal expansion type in which the second mounting portion 130 side is mounted on the vehicle V will be described with reference to FIGS. 16A to 16E.

As in the first mounting portion 120, the link assembly 400 is mounted on the rail 300 installed in the vehicle V. The movement is guided by the guide pin 420 mounted on the guide groove 320, and the sliding movement of the container 100 is easily configured by the rotary gear 430 rotated by the driving motor 440 (see FIG. 16A).

Figure 16A:
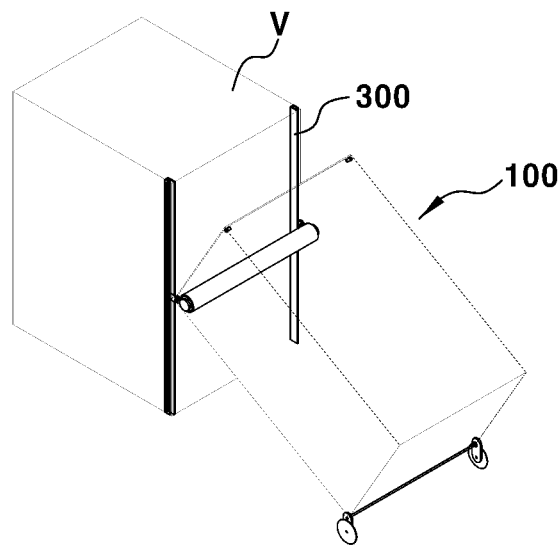
FIGS. 16A to 16E illustrate a process of mounting the horizontal expansion type of the luggage device according to embodiments of the present disclosure.
Figure 16B:
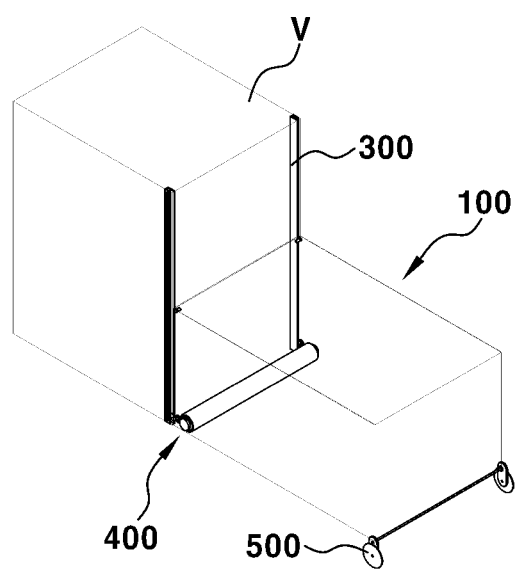
Figure 16C:
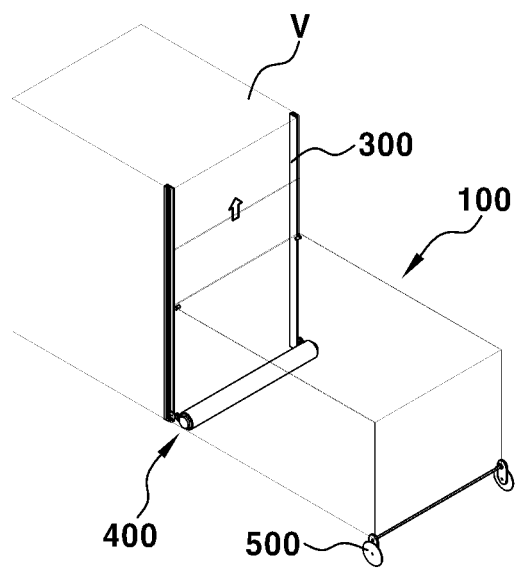
Figure 16D:
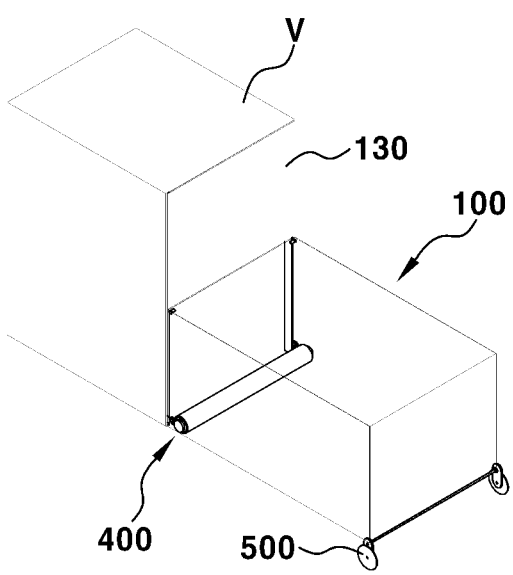

Since the second mounting portion 130 has an area smaller than that of the first mounting portion 120, when the second mounting portion 130 is mounted, the inside of the vehicle V communicates with the outside (see FIG. 16B). Therefore, to close this opening, the second mounting portion 130 moves upward in the height direction of the vehicle to close the opening (see FIGS. 16C and 16D).

Figure 16E:
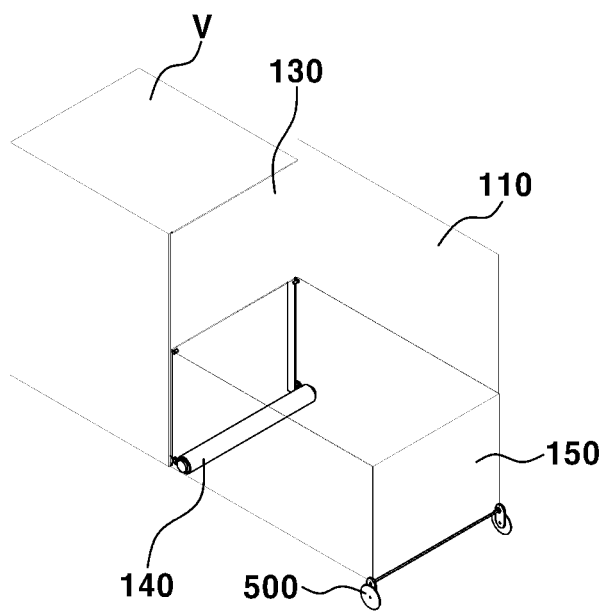

Loads may be loaded or unloaded by opening the door no (see FIG. 16E). In this way, more space corresponding to the length of the first mounting portion 120 is added to the vehicle, efficient for carrying long loads.

An operation process in which the second mounting portion 130 illustrated in FIGS. 16B to 16E moves upward in the height direction of the vehicle V will be described with reference to FIGS. 17A and 17B.

Figure 17A:
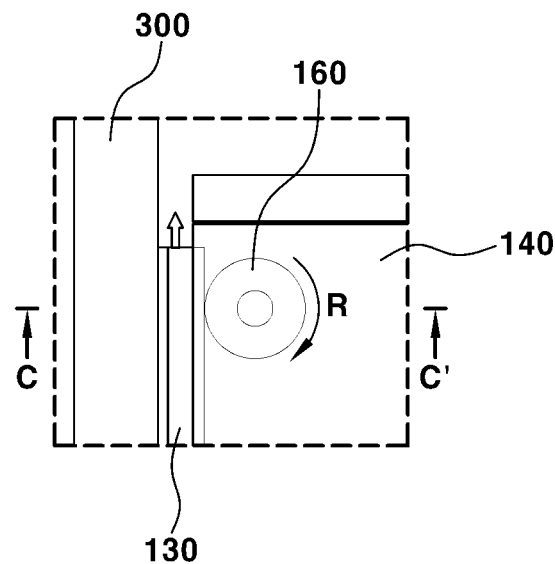
FIG. 17A is a diagram for explaining the movement of a second mounting portion for the luggage device according to embodiments of the present disclosure.
Figure 17B:
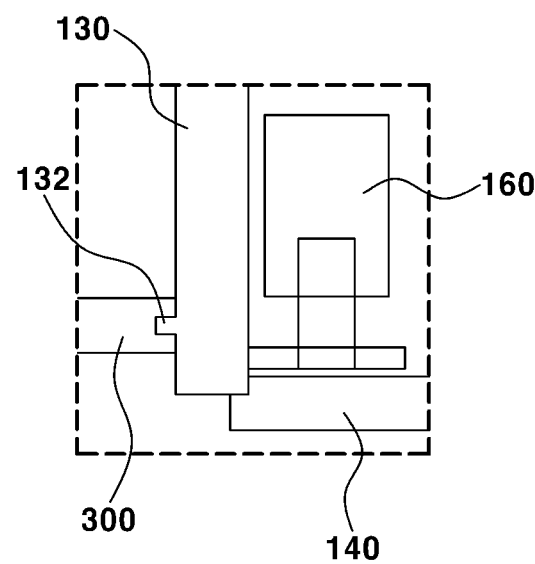
FIG. 17B illustrates a cross-sectional diagram taken along the line C-C' illustrated in FIG. 17A.

When the operation motor 160 is driven in the arrow direction indicated by R illustrated in FIG. 17A, the second mounting portion 130 moves upward along the rail 300. Further, the second mounting portion 130 includes the ridge 132 engaging with the depression 330 in the rail 300 to guide the movement of the second mounting portion 130.

Conversely, in case of moving the second mounting portion 130 downward, when the operation motor 160 is driven in the direction opposite to the arrow direction indicated by R illustrated in FIG. 17A, the second mounting portion 130 returns to the container 100 side by moving downward along the rail 300.

Further, according to embodiments of the present disclosure, the first mounting portion 120 is configured to be opened or closed when being switched from the vertical expansion type to the horizontal expansion type or from the horizontal expansion type to the vertical expansion type.

Figure 18:
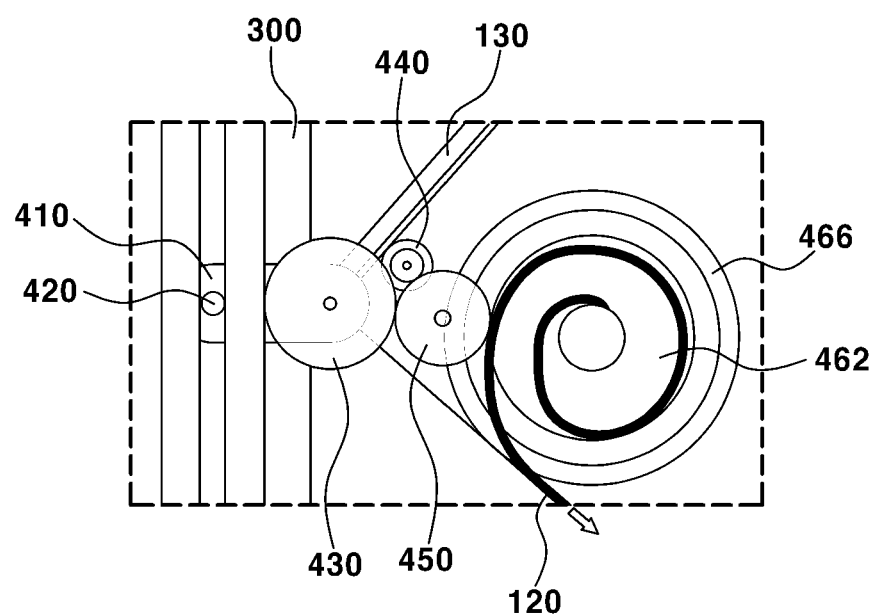
FIG. 18 is a diagram for explaining the unwound state of the first mounting portion for the luggage device according to embodiments of the present disclosure.

Referring to FIG. 18, as an exemplary embodiment, the first mounting portion 120 needs to be unwound from the roller unit 460 when being switched from the vertical expansion type to the horizontal expansion type. This may be achieved by the driving of the driving motor 440. That is, when the driving motor 440 rotates the main gear 450 clockwise, the roller gear 462 rotated in engagement with the main gear 450 rotates counterclockwise. Then, the first mounting portion 120 is unwound from the rod 464 in the arrow direction illustrated in FIG. 18 by the rotation of the rod 464 connected to the roller gear 462. Further, at this time, the rotary gear 430 is also rotated counterclockwise by the rotation of the main gear 450 and guided by the guide pin 420 and the link assembly 400 moves downward along the rail 300.

Figure 19A:
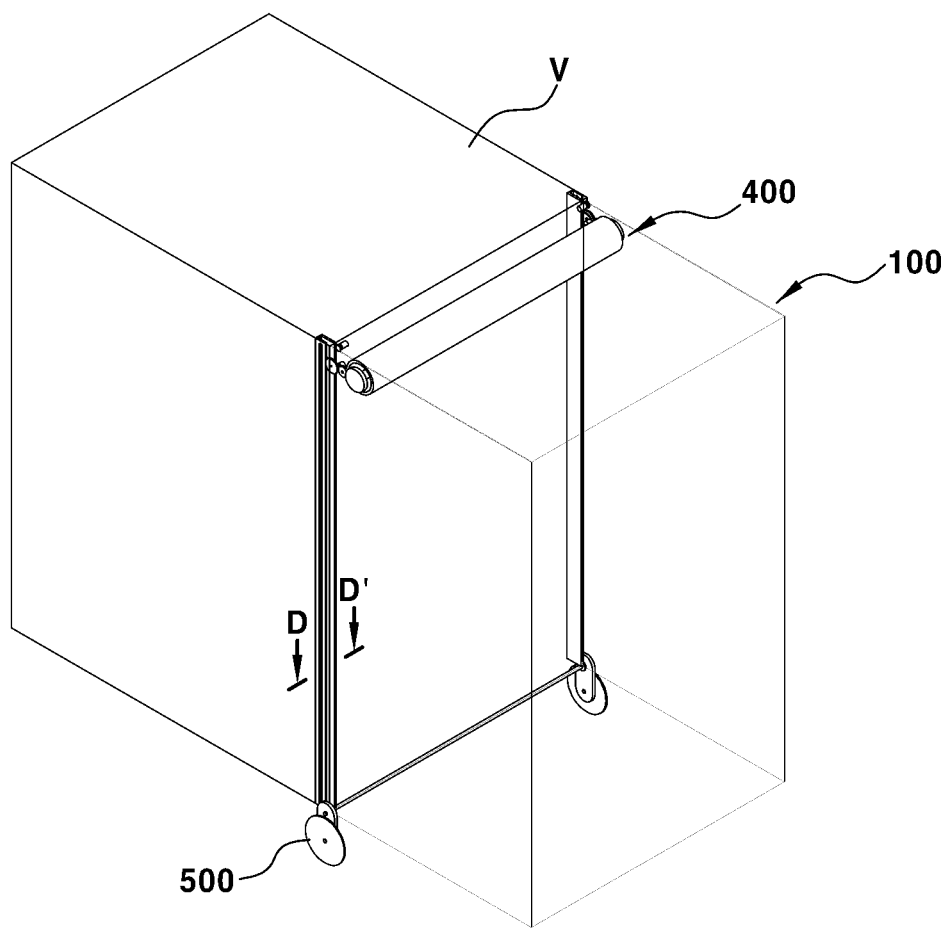
FIG. 19A illustrates a state where the first mounting portion is wound around the roller unit, in the luggage device according to embodiments of the present disclosure.
Figure 19B:
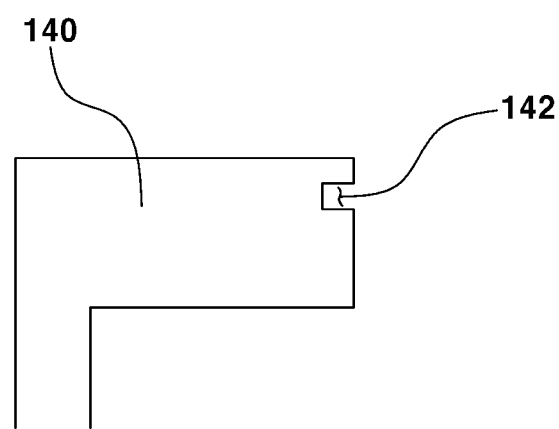
FIG. 19B illustrates a cross-sectional diagram taken along the line D-D' illustrated in FIG. 19A.
Figure 20A:
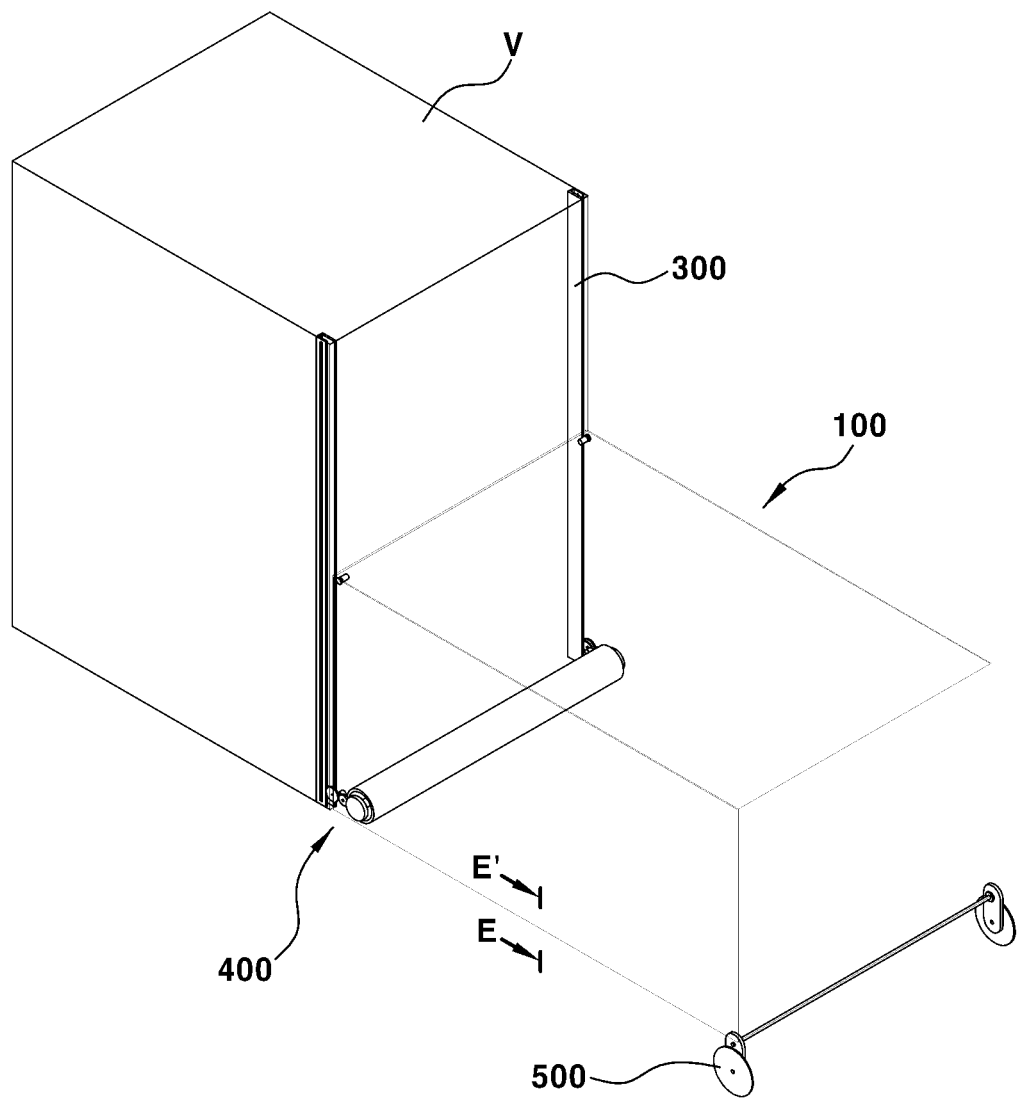
FIG. 20A illustrates a state where the first mounting portion is unwound from the roller unit, as the luggage device according to embodiments of the present disclosure.
Figure 20B:
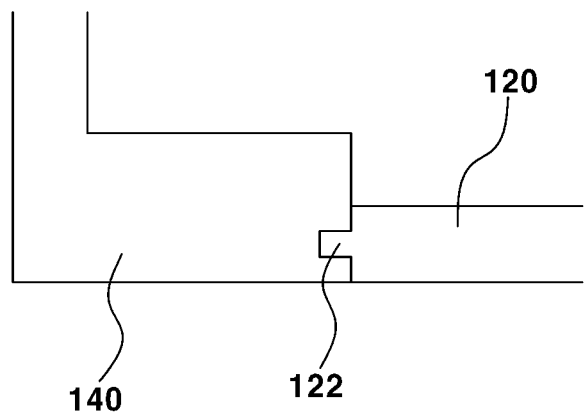
FIG. 20B illustrates a cross-sectional diagram taken along the line E-E' illustrated in FIG. 20A.

Further, to prevent the unwound first mounting portion 120 from being separated, the movement of the protrusions 122 provided on both sides of the first mounting portion 120 is guided by the coupling portion 142 formed on the side portion 140. FIGS. 19A and 19B illustrate the side portion 140 when the first mounting portion 120 is wound around the roller unit 460, and FIGS. 20A and 20B illustrate a case where the first mounting portion 120 is unwound to close the container 100.

The case where the horizontal expansion type is switched to the vertical expansion type operates in the same manner as described above. The first mounting portion 120 is required to be wound around the roller unit 460, and in this case, the driving motor 440 is rotated in the direction opposite to the previous direction, such that the rotational force thereof is transferred to the roller gear 462, and the first mounting portion 120 is gradually wound around the rod 464 while being switched from the horizontal expansion type to the vertical expansion type. Since a process of being switched from the horizontal expansion type to the vertical expansion type will be clearly understood to those skilled in the art from the description of the aforementioned switching from the vertical expansion type to the horizontal expansion type, more detailed description thereof will be omitted.

Figure 21A:
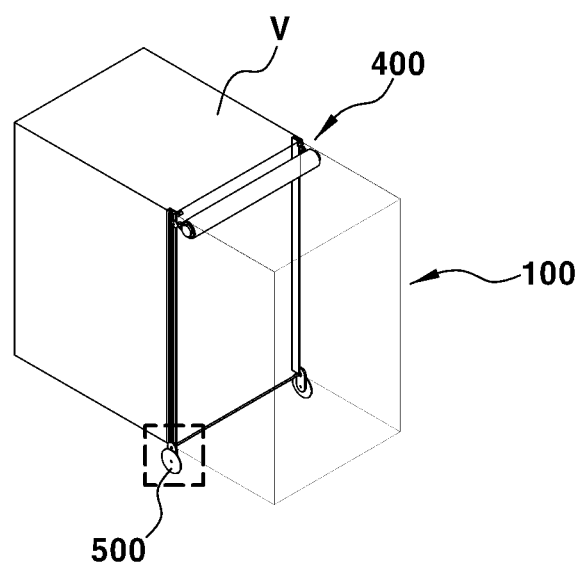
FIGS. 21A to 21C are diagrams for explaining an operation of a belt member, as the luggage device according to embodiments of the present disclosure.
Figure 21B:
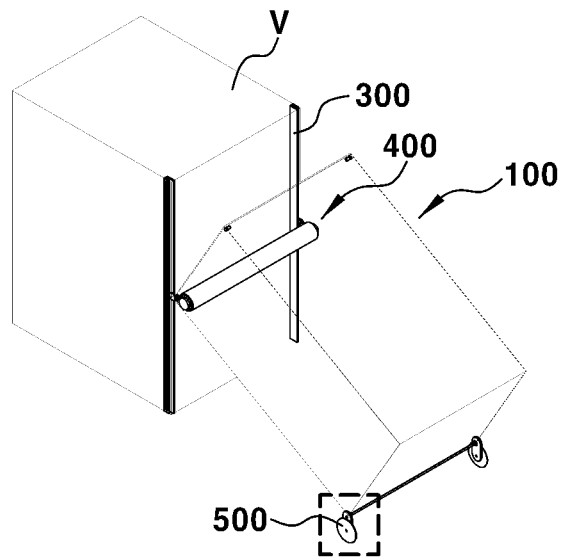
Figure 21C:
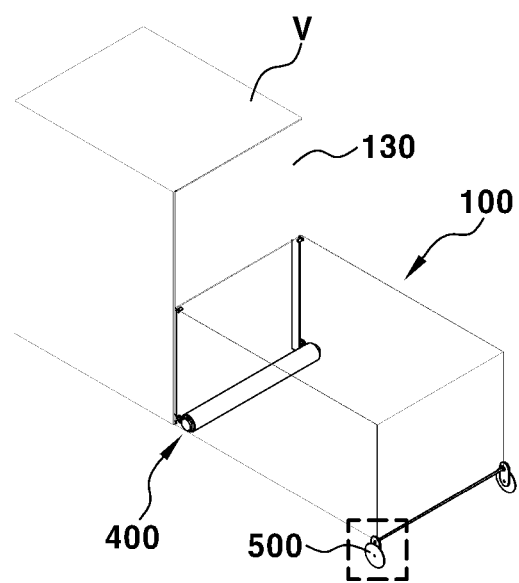

Further, the belt member 600 connects the roller gear 462 to the connection shaft 510 of the rolling member 500, thereby enabling the angular adjustment of the rolling member 500 according to the angular movement of the container 100. That is, the power of the driving motor 440 is transferred to the connection shaft 510 of the rolling member 500 through the roller gear 462 such that the rolling member 500 is always fixed to the same location according to the change in the angle for the horizontal direction of the container 100 (see FIGS. 21A to 21C).

Unlike prior art of simply mounting the luggage box at the rear of the vehicle, embodiments of the present disclosure may mount the luggage device on the tailgate side of the vehicle to connect the inner space of the vehicle to the space of the luggage device, thereby providing the expanded space.

Further, it is possible to easily change the mount direction of the luggage device according to the length or volume of the luggage, thereby having great utility in use.

Further, since the luggage device may be operated by the external power, such as the driving motor 440, it has an advantage of being very convenient in use.

It should be understood that the present disclosure is not limited to the above described embodiments and the accompanying drawings, and various substitutions, modifications, and alterations can be devised by those skilled in the art without departing from the technical spirit of the present disclosure.

What is claimed is:

1. A luggage device for a vehicle having a closable inner space therein, the luggage device comprising:
    a container comprising a door that is openable and closable, a first mounting portion facing the door and a second mounting portion configured to connect the door to the first mounting portion, the container having a fillable space formed therein; and
    a drive mechanism configured to connect the container to the vehicle such that the first mounting portion or the second mounting portion is attached to the mount subject and to switch mount directions of the container, wherein the drive mechanism is further configured such that:
    in a first configuration, the first mounting portion is attached on the vehicle while selectively communicating with the closable inner space of the vehicle through the first mounting portion that is openable, and
    in a second configuration, the second mounting portion is attached on the vehicle while selectively communicating with the closable inner space of the vehicle through the second mounting portion that is openable.

2. The luggage device of claim 1, wherein the first mounting portion is configured to be opened or closed.

3. The luggage device of claim 1, wherein the second mounting portion is configured to be opened or closed.

4. The luggage device of claim 3, further comprising an operation motor provided on the container and configured to slide the second mounting portion.

5. The luggage device of claim 4, wherein the operation motor is mounted on an inner side of the container at a portion where the second mounting portion and the door meet and is configured to slide the second mounting portion in a direction away from the first mounting portion or the second mounting portion in a direction toward the first mounting portion.

6. The luggage device of claim 1, wherein the drive mechanism comprises:
a rail mounted on the vehicle; and
a link assembly configured to be slidable along the rail and coupled to the container.

7. The luggage device of claim 6, wherein the link assembly is mounted on a portion where the first mounting portion and the second mounting portion of the container meet.

8. A luggage device for a vehicle comprising:
a container comprising a door that is openable and closable, a first mounting portion facing the door, and a second mounting portion configured to connect the door to the first mounting portion, the container having a fillable space formed therein; and
a drive mechanism configured to connect the container to a mount subject such that the first mounting portion or the second mounting portion is attached to the mount subject and to switch mount directions of the container, the drive mechanism comprising a rail mounted on the mount subject and a link assembly configured to be slidable along the rail and coupled to the container, the link assembly comprising a base plate coupled to the container and a guide pin mounted at one side of the base plate and configured to guide a movement direction of the link assembly on the rail and to be inserted into a guide groove arranged in the rail.

9. The luggage device of claim 8, wherein the link assembly further comprises a rotary gear disposed on the base plate to be in contact with the rail and configured to rotate along the rail.

10. The luggage device of claim 9, wherein the link assembly further comprises:
a main gear mounted on the container and configured to engage with the rotary gear to transfer a rotational force to the rotary gear; and
a driving motor mounted on the container and configured to provide the rotational force to the main gear.

11. The luggage device of claim 10, wherein the link assembly further comprises a roller unit mounted on the container and configured to rotate by a rotation of the main gear and to wind or unwind the first mounting portion by the rotation.

12. The luggage device of claim 11, wherein the roller unit comprises a roller gear configured to directly receive the rotational force by the main gear.

13. The luggage device of claim 12, further comprising:
a pair of rolling members mounted at each of opposite sides of the second mounting portion to support the container; and
a connection shaft configured to connect the pair of rolling members along the container.

14. The luggage device of claim 13, further comprising a pair of belt members configured to connect the roller gear to the pair of rolling members.

15. A luggage device for a vehicle comprising:
a container comprising a door, a first mounting portion facing the door, and a second mounting portion configured to connect the door to the first mounting portion, the container having a fillable space formed therein;
a rail mounted on a wall of a mount subject and including an insertion groove opened toward an outside of the mount subject and facing the first mounting portion and a guide groove opened toward a direction substantially perpendicular to the insertion groove and toward the wall of the mount subject; and
a link assembly connected to the rail and configured to be movable on the rail.

16. The luggage device of claim 15, wherein the first mounting portion or the second mounting portion is configured to be opened or closed.

17. The luggage device of claim 15, further comprising an operation motor mounted on an inner side of the container at a portion where the second mounting portion and the door meet and configured to slide the second mounting portion in a direction away from the first mounting portion or the second mounting portion in a direction toward the first mounting portion.

18. The luggage device of claim 15, wherein the rail includes a depression recessed from a surface of the rail and positioned at a side of the rail facing the first mounting portion or the second mounting portion.

19. The luggage device of claim 18, wherein the depression is configured to engage with a ridge of the second mounting portion to guide a movement of the second mounting portion.

20. The luggage device of claim 15, wherein the link assembly comprises:
a base plate coupled to the container;
a guide pin coupled at one side of the base plate and configured to be inserted into the guide groove of the rail to guide a movement of the link assembly on the rail;
a rotary gear rotatably mounted at a second side of the base plate and configured to contact and roll along the rail;
a driving motor disposed on an inner side of the container and configured to implement a relative location change of the container, a change in a mount direction of the container, and detachment and attachment of the container;
a main gear rotatably mounted on the container; and
a roller gear contacting the main gear.

* * * * *